May 2, 1933.  E. W. GAY  1,906,955
ELECTRIC STORAGE BATTERY
Filed Dec. 30, 1931   3 Sheets-Sheet 1

Edson W. Gay
Inventor

By Herbert E. Smith
Attorney

Edson W. Gay
Inventor

Patented May 2, 1933

1,906,955

UNITED STATES PATENT OFFICE

EDSON W. GAY, OF KELLOGG, IDAHO, ASSIGNOR OF ONE-THIRD TO ARTHUR R. EMERY, OF KELLOGG, IDAHO

ELECTRIC STORAGE BATTERY

Application filed December 30, 1931. Serial No. 583,806.

My present invention relates to improvements in electric storage batteries of the secondary type, and involving the use of bimetallic plates, as lead and zinc, and the invention relates particularly to means whereby the plates may be assembled and retained or supported in the cell, and the plates may, with facility, be removed when necessary for repairs or other purposes.

As is well known to those familiar with the construction and operation of batteries or cells of this type now in use, great difficulty is experienced when it is necessary to remove the plates, for repairs or other purposes, and the removal of the plates, especially the cathodes, is frequently accomplished at the expense of ruining the plates, or breaking their supports. The primary object of my invention is the provision of means that are simple in construction and operation, whereby the plates, usually arranged in groups may readily be assembled and retained in assembled operative position within the cell, and whereby the supports or holders at one end of the plates may be withdrawn therefrom, thus releasing the plates to facilitate their removal from the cell.

To accomplish the above objects my invention consists in certain novel combinations and arrangements of parts involving the plates and their supports, as will hereinafter be more fully set forth and claimed.

In the accompanying drawings I have illustrated one complete example of the physical embodiment of my invention wherein the parts are combined and arranged according to one mode I have thus far devised for the practical application of the principles of my invention.

Figure 1:
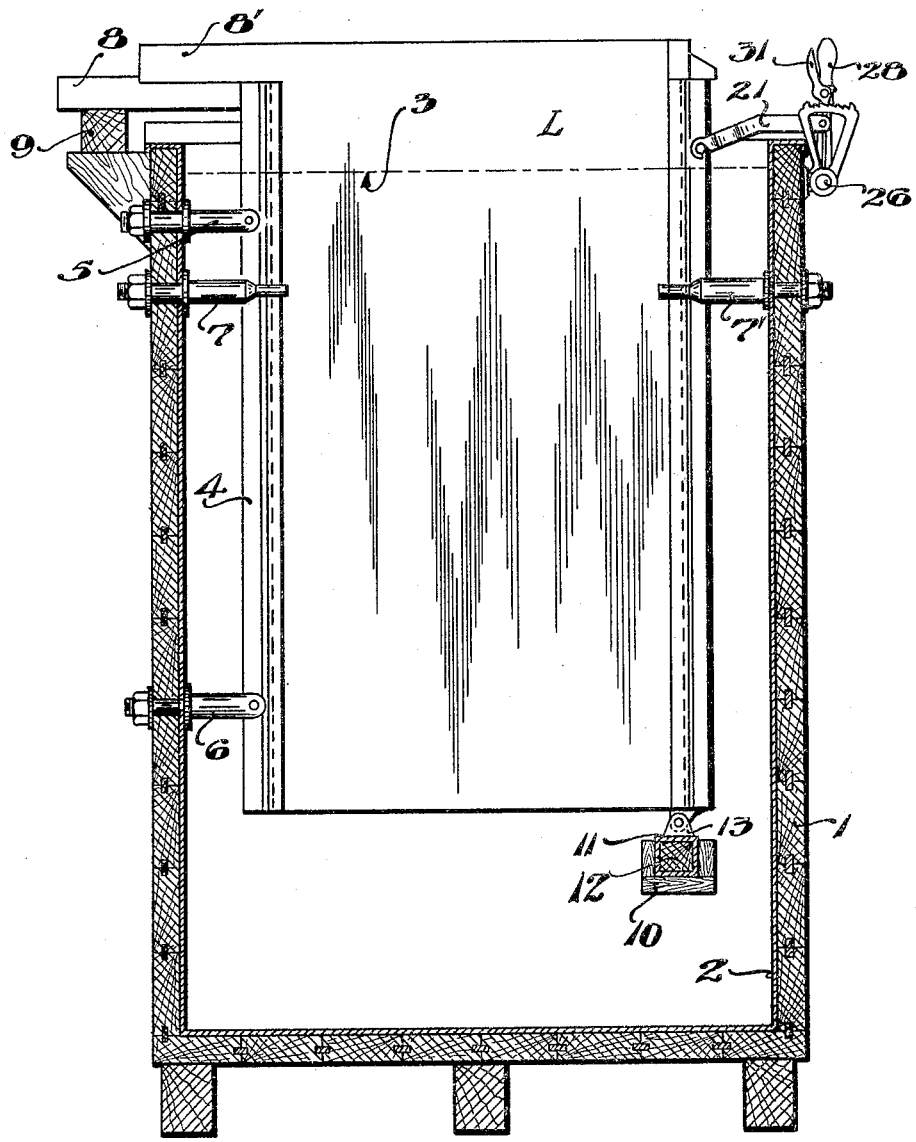
Figure 1 is a vertical sectional view of a battery cell in which my invention is embodied.

In the drawings I have shown a well known type of battery cell or receptacle 1 fashioned in rectangular shape of wood, and provided with an interior lining 2, and the plates are arranged in groups of three with the lead cathode or negative plate L between the zinc anodes or positive plates Z, Z, of the groups. The bottom edges of the plates are elevated above the bottom of the cell to prevent short circuiting of the plates, in the event that foreign materials or sediment should collect in the electrolyte, at the bottom of the cell.

The surface of the electrolyte is indicated at the line 3 in Figure 1, and, as usual, on sending a charging current through the cell, the electrical energy is stored therein, for the various uses and performance of usual functions of the storage battery or cell.

At one side of the cell a number of spaced, grooved rails, or stationary holders 4 are supported from the wall of the cell by means of the upper and lower studs 5 and 6, and these grooved rails or holders receive the lateral edges of the plates and retain them in spaced, parallel, vertical position. Guide studs 7 are also secured in the wall of the cell, between groups of plates, and this horizontal series of guide studs is duplicated, as at 7' in the opposite wall of the cell, for alining the opposite lateral edges of the plates, in groups.

The plates are provided with the usual terminal lugs 8 and 8' at their tops, and rest on the supporting bar 9 at the top of the cell, the lugs being connected in usual manner by the straps or conductors, not shown.

Thus, at the left edge of each plate in Figure 1, the plate is supported in a rigid and stationary grooved holder 4, while at the right edge of the plates in Figure 1 the plates are held by a set of movable rails or holders that are pivoted at their lower ends, and designed to swing on their pivots outwardly, or toward the adjoining cell-wall.

For the support of the movable holders at the right edges of the plates, I provide a U-shaped stirrup 10 that is located in a position elevated from the bottom of the cell, adjacent one end wall thereof, and in this stirrup the receiver-bar 12 is rigidly fixed between the opposed walls of the cell. As shown, the receiver-bar 12 with its lead covering 11 extends transversely of the plates and substantially the full length of the cell.

On its upper face, at spaced intervals, the pivot bar 12 is fashioned with a number of perforated ears or lugs 13, complementary to the number of plates, and each plate is provided with a grooved end spacing rail 14, complementary to the holders 4 at the opposite edges of the plates. These spacing rails are preferably of hard rubber, and they are arranged in upright position and each fashioned with a back flange 15. At their lower ends these spacing rails are formed with perforated lugs 16 complementary to the lugs or ears 13 of the pivot bar, and a pivot pin 17 is passed through the alined ears 13 and 16 to form a pivotal support for the spacing rails.

Figure 4:
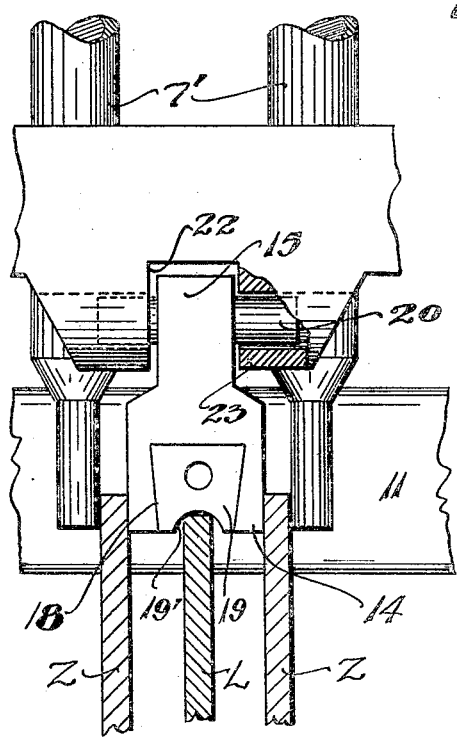
Figure 4 is an enlarged, detail view, partly broken away showing one of the units or groups of plates in Figure 3, and part of the releasing device.
Figure 5:
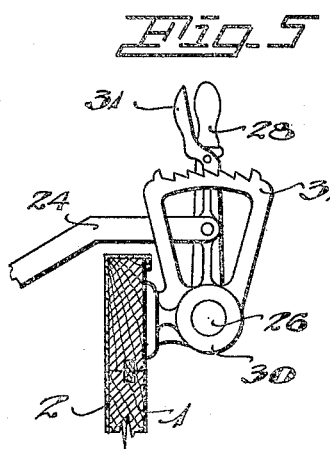
Figure 5 is a detail view of the ratchet lever employed for securing and releasing the plate holders.

As best seen in Figure 4 the spacing rails 14 are fashioned with dovetail grooves 18, and a dovetail tongue 19, of soft rubber, is retained in each groove, as an abutment for the edge of the cathodes or lead plates L. The abutting face of the rubber tongue 19 is preferably grooved as at 19' to receive the edge of the plate L and to retain the plate in the tongue against lateral displacement.

Figure 2:
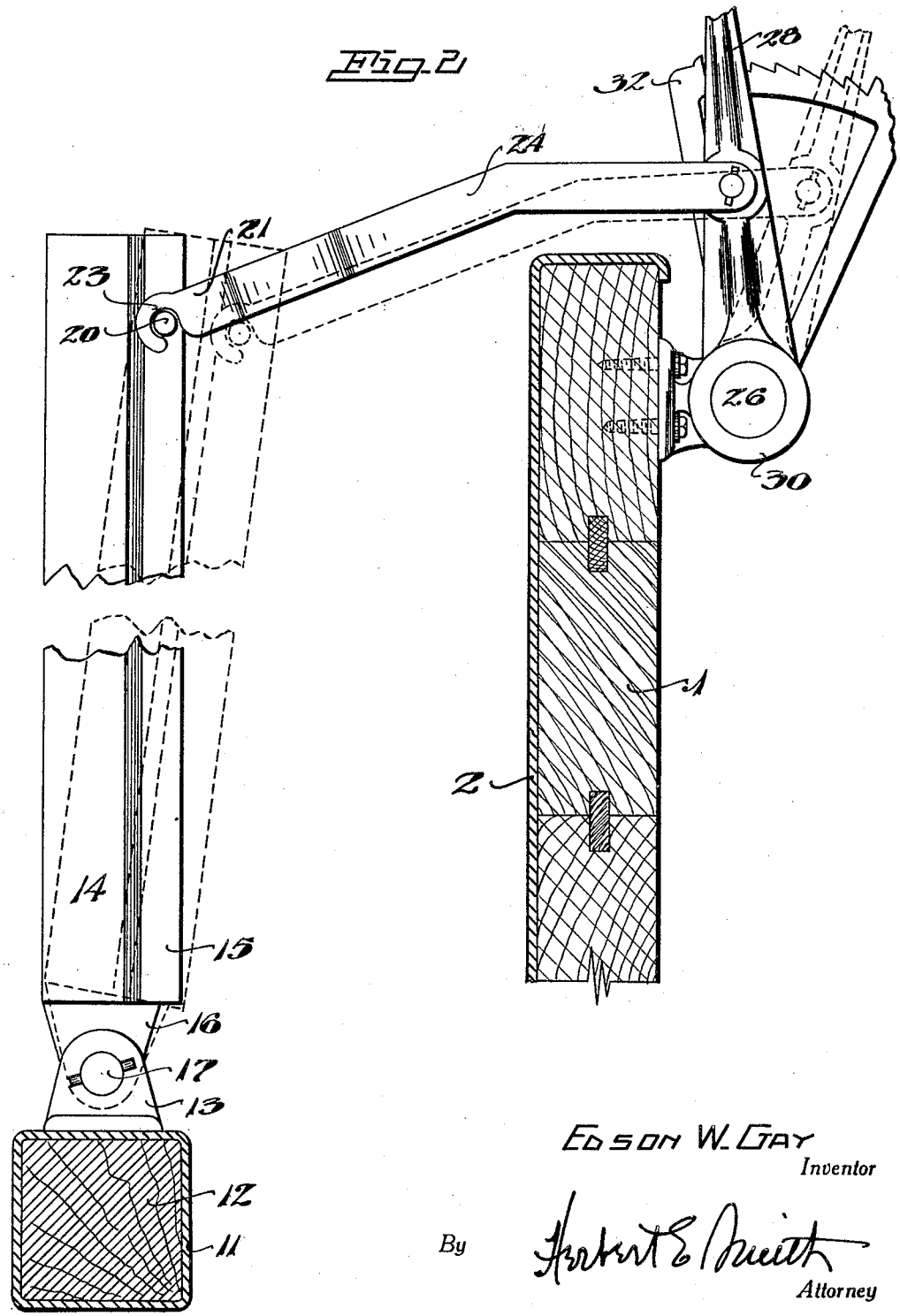
Figure 2 is an enlarged detail view, partly in section, showing the movable supports, and their operating means, and indicating by dotted lines the movement of the supports in releasing the plates.
Figure 3:
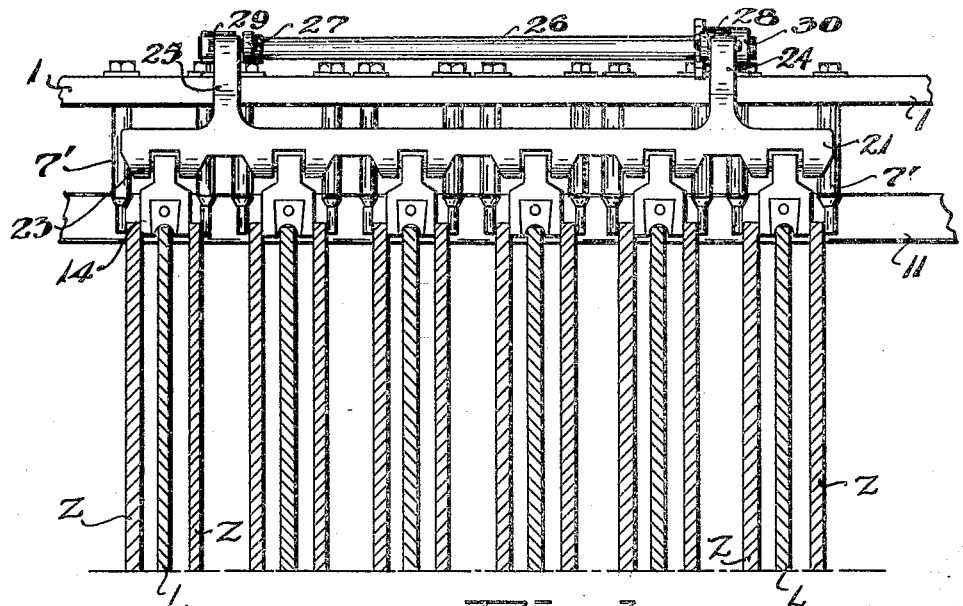
Figure 3 is a top plan view at one side of the cell, the supported ends of the groups of plates, and the means for releasing the supported plates.

At their upper ends, the flanges 15 of the rails 14 are provided with laterally projecting, horizontal trunnions 20, one at each side of the flange, and through the instrumentality of these trunnions, and an operating device, the rails 14 may be swung on their pivots 17 to position to retain the plates, as in Figure 1, or the rails may be swung on their pivots, as indicated by dotted lines in Figure 2 to release the rails from the plates, and thereby permit removal of the released plates.

For moving the rails I employ a horizontally disposed operating bar 21, of lead, which extends in a plane between a wall of the cell, or at the top of the wall of the cell, and alongside the flanges of the rails. At spaced intervals the operating bar is notched, as at 22 to fit around the edge of the flange 15, and at opposite sides of these notches are fashioned hooks 23 that engage over the trunnions 20 of the flanges, as best seen in Figures 2 and 4.

Near the opposite ends of the operating bar are arranged laterally extending arms 24 and 25, which are connected to a pair of lever arms 27 and 28, the lever arms being keyed to the shaft 26, that are pivoted in the bearings 29 and 30 attached at the outer side of the cell wall near the top edge thereof. The lever arm 28 is fashioned with a handle by means of which the operating bar may be swung on the pivot 29 and 30 as a center and through the pivotal connections involving the arms 24 and 25.

A pawl 31 is pivoted on the lever arm 28 for engagement with the teeth of the ratchet sector or segment 32, which is fashioned rigidly with the bracket 30, to hold the lever arm in adjusted position.

Thus it will be apparent that by manipulating the lever arm 28, from dotted position to full line position in Figure 1, the tongues or strips 19 of the rails are pushed into close contact with the edges of the cathodes, and the spacing rails 14 are pushed in between the two anodes L, L, of the groups of plates, as indicated in Figure 4, for supporting the plates at the right side of Figure 1, and the anodes are retained in upright position between the adjoining studs 7' and the spacing rail 14.

When it is desired to remove the plates, the lever arm 28 is pulled to the right in Figure 2 to the dotted position, thus swinging the movable spacing rails out of engagement with the plates, and the released plates are then free to be withdrawn from the stationary holders 4 at the left side of Figure 1.

By withdrawing the hard rubber spacing rails with their softer rubber tongues from the plates, the plates are simultaneously released without danger of breaking, and without danger of breaking or marring the hard rubber rails or their rubber tongues, and in Figure 2 it will be apparent that when the rails are swung to the dotted line position sufficient space is provided for the withdrawal of the plates in order that they may be removed from the cell.

Preferably the operating bar 21, the pivot bar 11, studs or guides 6, 6, and 7, 7', and other parts of this nature are fashioned of lead, while the grooved holders and rails are of insulating material as hard rubber, with the inset tongues 19 fashioned of softer rubber to act as cushions for the edges of the cathodes or negative plates.

While I have illustrated and described one exemplification of my invention, it will be understood that changes and alterations may be made therein within the scope of my appended claims without departing from the spirit of my invention.

Having thus fully described my invention, what I claim as new and desire to secure by Letters Patent is:

1. In a battery cell, the combination with spaced, upright, stationary holders, and plates supported in said holders at one edge thereof, of a support within the cell, complementary movable rails mounted on said support for engagement with the opposite edges of the plates, and means for moving said rails to release the plates.

2. In a battery cell, the combination with an upright plate-holder and means for rigidly supporting said holder in the cell, of a plate having one edge supported in said holder, a support beneath the opposite edge of the plate, a rail pivoted on said support and engaging the other edge of the plate, and means for swinging said rail to release the latter from the plate.

3. In a battery cell, the combination with a grooved, upright, stationary holder and a plate having one edge engaged in said grooved holder, of a transversely disposed pivot-bar and supporting means therefor, a rail pivoted on said pivot bar and adapted to engage the other edge of the plate, and means for swinging said rail to release plate therefrom.

4. In a battery cell, the combination with a plurality of plates, of a stationary holder at one edge of the plates and a movable holder at the opposite edge of said plates, means for moving the latter holder to release a plate, and spacing guides between adjoining plates.

5. In a battery cell, the combination with a grooved, upright stationary holder and a plate having one edge engaged in said holder, of a transversely disposed pivot bar and supporting means therefor, a rail pivoted on said bar and adapted to engage the other edge of the plate, trunnions on said rail, an operating bar having a pivotal support, hooks on the bar for co-action with the trunnions, and means for swinging said operating bar for the purpose described.

6. In a battery cell, the combination with a grooved, upright, stationary holder and a plate having one edge engaged in said holder, of a receiver bar secured in the cell and disposed transversely of the plate, a pivot-bar located in said receiver bar, a rail pivoted on said pivot bar and engaging the other edge of the plate, trunnions on said rail, a pivoted operating bar and hooks on said bar for engagement with the trunnions, and means for swinging said operating bar for the purpose described.

7. In a battery cell, the combination with a plate, of a grooved rail and a pivotal support therefor, a rubber tongue mounted in the grooved rail for contact with the edge of the plate, and means for swinging said rail for the purpose described.

In testimony whereof I affix my signature.

EDSON W. GAY.